United States Patent
Kareem et al.

(10) Patent No.: US 8,694,290 B2
(45) Date of Patent: Apr. 8, 2014

(54) MONTE CARLO ANALYSIS EXECUTION CONTROLLING METHOD AND MONTE CARLO ANALYSIS EXECUTION CONTROLLING APPARATUS

(75) Inventors: Fazul Kareem, Yokohama (JP); Yoshihiro Shibusawa, Yokohama (JP)

(73) Assignee: Kabushiki Kaisha Toshiba, Tokyo (JP)

(*) Notice: Subject to any disclaimer, the term of this patent is extended or adjusted under 35 U.S.C. 154(b) by 295 days.

(21) Appl. No.: 13/232,841

(22) Filed: Sep. 14, 2011

(65) Prior Publication Data

US 2012/0245906 A1 Sep. 27, 2012

(30) Foreign Application Priority Data

Mar. 25, 2011 (JP) ................. 2011-068614

(51) Int. Cl.
*G06F 17/50* (2006.01)
(52) U.S. Cl.
USPC ....................... 703/2; 703/6; 716/52
(58) Field of Classification Search
USPC ............................. 703/2, 6; 716/52
See application file for complete search history.

(56) References Cited

U.S. PATENT DOCUMENTS 8,108,805 B2 * 1/2012 Rathsack .................. 716/52
2008/0300847 A1 12/2008 Mcconaghy et al.

FOREIGN PATENT DOCUMENTS

JP 2003-006263 1/2003
JP 2005-107896 4/2005

* cited by examiner

*Primary Examiner* — Thai Phan
(74) *Attorney, Agent, or Firm* — Knobbe Martens Olson & Bear LLP

(57) ABSTRACT

In an embodiment, a confidence interval of a yield is calculated with a set specification of an evaluation item and confidence level and values of the evaluation item obtained in Monte Carlo simulations to determine whether or not a target yield is within the confidence interval of the yield. In a case where the target yield is within the confidence interval of the yield, a Monte Carlo simulation executing unit is instructed to execute a subsequent Monte Carlo simulation. In a case where the target yield is not within the confidence interval of the yield, it is determined that the target yield will be achieved when a minimum value of the confidence interval of the yield is the target yield or larger while it is determined that the target yield will not be achieved when a maximum value of the confidence interval of the yield is below the target yield.

17 Claims, 10 Drawing Sheets

US 8,694,290 B2

MONTE CARLO ANALYSIS EXECUTION CONTROLLING METHOD AND MONTE CARLO ANALYSIS EXECUTION CONTROLLING APPARATUS

CROSS REFERENCE TO RELATED APPLICATIONS

This application is based upon and claims the benefit of priority from the prior Japanese Patent Application No. 2011-68614, filed on Mar. 25, 2011, the entire contents of which are incorporated herein by reference.

FIELD

Embodiments described herein relate generally to a Monte Carlo analysis execution controlling method and a Monte Carlo analysis execution controlling apparatus.

BACKGROUND

In a Monte Carlo analysis, the number of times of execution of a simulation has a great effect on confidence of an analysis result. Accordingly, in a case where the number of times of execution of the simulation is insufficient, a highly confident analysis result cannot be obtained, which may cause wrong determination. On the other hand, as the number of times of execution of the simulation is increased, a more confident analysis result can be obtained, but more time and resources are required for the analysis, and redundant simulations may be conducted.

DETAILED DESCRIPTION

An embodiment of the present invention provides a Monte Carlo analysis execution controlling method determining whether or not a circuit will achieve a target value of a yield at a predetermined confidence level. In this method, first, a target yield as the target value of the yield, a specification of an evaluation item, and a confidence level are set. Subsequently, a Monte Carlo simulation executing unit is instructed to execute a Monte Carlo simulation to obtain a value of the evaluation item of the circuit. After completion of the Monte Carlo simulation, a confidence interval of a yield as an available range of the yield of the circuit at the confidence level is calculated with use of values of the evaluation item obtained in Monte Carlo simulations executed previously, the specification of the evaluation item, and the confidence level. Subsequently, first determination processing to determine whether or not the target yield is within the confidence interval of the yield is conducted. Subsequently, in a case where the target yield is within the confidence interval of the yield as a result of the first determination processing, the Monte Carlo simulation executing unit is instructed to execute a subsequent Monte Carlo simulation. On the other hand, in a case where the target yield is not within the confidence interval of the yield as a result of the first determination processing, second determination processing is conducted in which it is determined that the target yield will be achieved when a minimum value of the confidence interval of the yield is the target yield or larger while it is determined that the target yield will not be achieved when a maximum value of the confidence interval of the yield is below the target yield.

Hereafter, two embodiments of the present invention will be described with reference to the drawings.

First Embodiment

Figure 1:
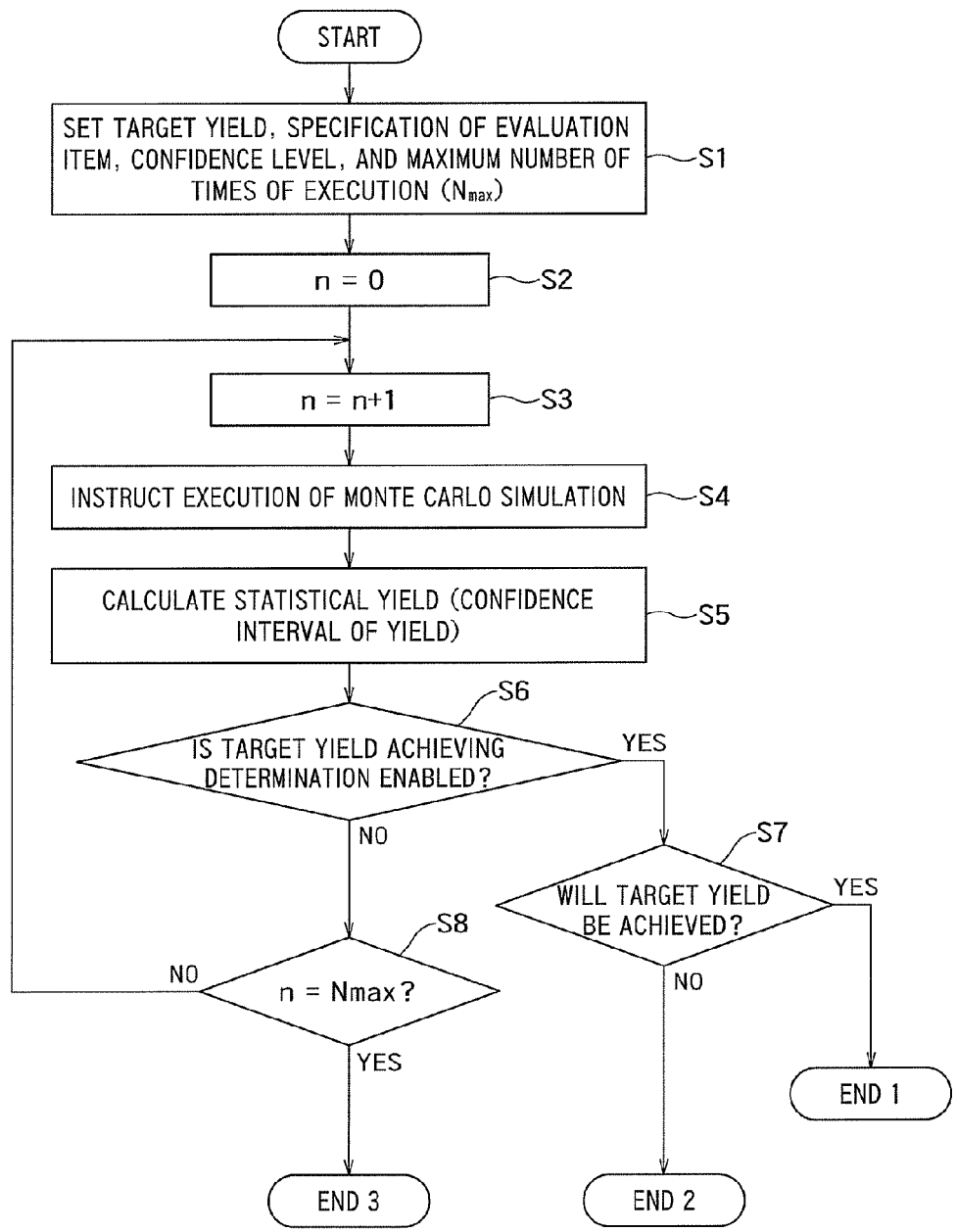
FIG. 1 is a flowchart illustrating a Monte Carlo analysis execution controlling method according to a first embodiment.

A Monte Carlo analysis execution controlling method according to a first embodiment will be described based on a flowchart in FIG. 1.

(1) First, a target yield ($Y_{target}$), a specification of an evaluation item (maximum value: $SPEC_{max}$, minimum value: $SPEC_{min}$), a confidence level, and a maximum number of times of execution ($N_{max}$) are set (Step S1).

The target yield is a target value of a yield and is selected, e.g., from among $1\sigma$ to $5\sigma$. In a case where it is set to $3\sigma$, this means 99.73% samples satisfy the specification of an evaluation item.

The specification of an evaluation item is a specification of a marked evaluation item, that is, at least either a maximum value or a minimum value of the evaluation item. For example, in a case of an oscillator (analog custom IC) designed to oscillate at 32 kHz, the evaluation item is the oscillating frequency, and the specification of the evaluation item is 32 kHz±3%.

The confidence level represents confidence in a result of a Monte Carlo analysis and is selected, e.g., from among 95%, 98%, 99%, and 99.8%. It is to be noted that the higher the confidence level is, the wider the confidence interval becomes.

The maximum number of times of execution is a maximum number of times of execution of a simulation in the Monte Carlo analysis (hereinafter referred to as "Monte Carlo simulation" or merely "simulation") and is set, e.g., in consideration of a verification schedule.

(2) Subsequently, the number of times of execution of the Monte Carlo simulation (n) is initialized (n=0) (Step S2).

(3) Subsequently, the number of times of execution of the Monte Carlo simulation (n) is incremented by one (Step S3).

(4) Execution of the Monte Carlo simulation is instructed (Step S4). More specifically, a Monte Carlo simulation executing unit is instructed to execute one simulation to obtain a value of the evaluation item with respect to a parameter set. Here, the parameter set is a collection of parameters that influence the value of the evaluation item. Values of the parameters are generated based on an after-mentioned device model and random numbers and differ with a simulation. Exemplary kinds of the parameters constituting the parameter set in the case of the oscillating frequency of the oscillator (analog custom IC) raised as an evaluation item in the above example are a thickness of a gate oxide film and a threshold voltage of a MOS transistor.

The Monte Carlo simulation executing unit executes Monte Carlo simulations with use of circuit data such as a netlist representing a circuit configuration to be analyzed and the device model containing kinds of the parameters and characteristics (average, standard deviation, etc.) for each parameter. A value of the evaluation item is obtained per execution of this Monte Carlo simulation.

(5) A statistical yield is calculated (Step S5).

Figure 2:
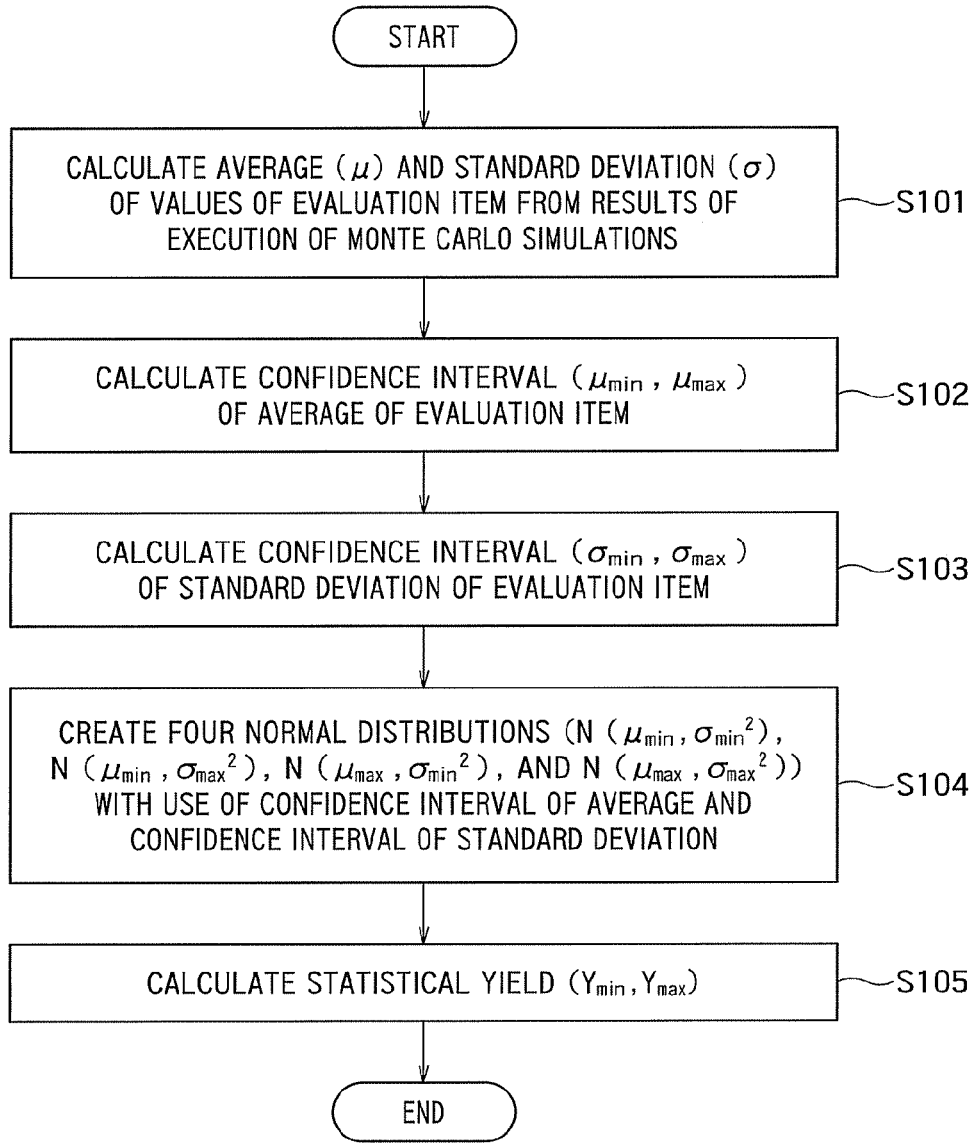
FIG. 2 is a flowchart illustrating a calculation method of a statistical yield.

A detailed calculation procedure of this statistical yield will be described with reference to FIG. 2.

First, an average ($\mu$) and a standard deviation ($\sigma$) of values of the evaluation item are calculated from the results of the execution of the previous Monte Carlo simulations (i.e., as many times as n) (Step S101).

Subsequently, a confidence interval of the mean of the values of the evaluation item is calculated (Step S102). A specific calculation method is as follows.

A standard error ($\sigma_{error}$) is derived by Equation (1) with use of the standard deviation ($\sigma$) calculated at Step S101:

$$\sigma_{error} = \frac{\sigma}{\sqrt{n}} \quad (1)$$

where $\sigma$ is the standard deviation calculated at Step S101, and n is the number of times of execution of the Monte Carlo simulation.

Subsequently, with reference to a t distribution table, a value t corresponding to the confidence level set at Step S1 is derived.

Subsequently, a value A corresponding to the width of the confidence interval is derived by Equation (2):

$$A = t_{value} \cdot \sigma_{error} \quad (2)$$

where $t_{value}$ is t the value t corresponding to the confidence level set at Step S1, and $\sigma_{error}$ is the standard error calculated by Equation (1).

A minimum value ($\mu_{min}$) and a maximum value ($\sigma_{max}$) of the confidence interval of the average are given by Equation (3) and Equation (4), respectively.

$$\mu_{min} = \mu - A \quad (3)$$

$$\mu_{max} = \mu + A \quad (4)$$

Subsequently, a confidence interval of the standard deviation of the evaluation item is calculated (Step S103). Specifically, a minimum value ($\sigma_{min}$) and a maximum value ($\sigma_{max}$) of the confidence interval of the standard deviation are given by Equation (5) and Equation (6), respectively.

$$\sigma_{min} = \sigma \sqrt{\frac{n-1}{\chi^2(\frac{\alpha}{2})}} \quad (5)$$

$$\sigma_{max} = \sigma \sqrt{\frac{n-1}{\chi^2(-\frac{\alpha}{2})}} \quad (6)$$

In Equations (5) and (6), $\sigma$ is the standard deviation calculated at Step S101, and n is the number of times of execution of the Monte Carlo simulation. $\alpha$ is 1−(confidence level set at Step S1 [%]/100). For example, in a case where the confidence level is 95%, a value of $\alpha$ is 0.05. $\chi^2()$ represents an $\chi^2$ distribution and can be derived with reference to an $\chi^2$ distribution table.

Subsequently, with use of the confidence interval of the mean and the confidence interval of the standard deviation calculated at Steps S102 and S103, four normal distributions N ($\mu_{min}$, $\sigma_{min}^2$), N ($\mu_{min}$, $\sigma_{max}^2$), N ($\mu_{max}$, $\sigma_{min}^2$), and N ($\mu_{max}$, $\sigma_{max}^2$) are created (Step S104).

Figure 3:
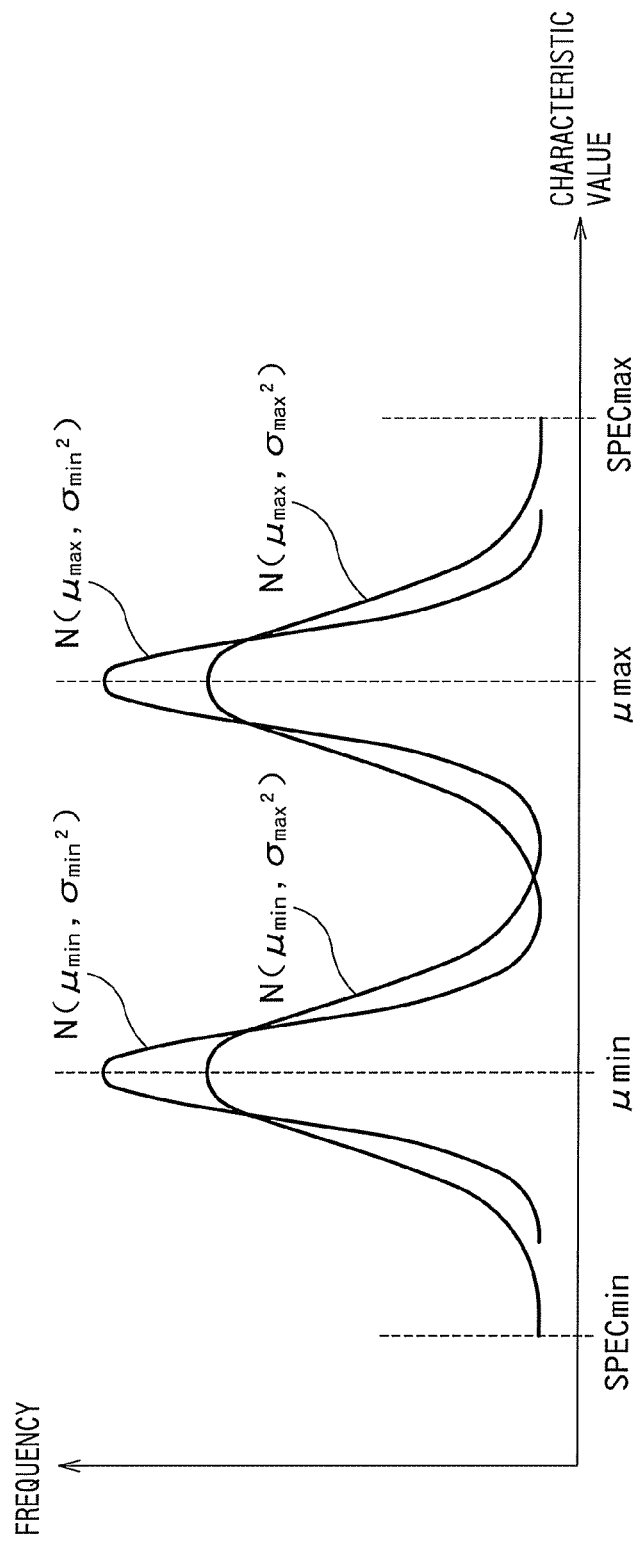
FIG. 3 illustrates relationship of four normal distributions created when the statistical yield is calculated.

Examples of the four normal distributions created are illustrated in FIG. 3. $SPEC_{min}$ and $SPEC_{max}$ in FIG. 3 respectively represent the maximum value and the minimum value of the evaluation item set at Step S1.

Subsequently, the statistical yield is calculated (Step S105).

Specifically, yields Y1, Y2, Y3, and Y4 are first calculated for the four normal distributions created at Step S104. In other words, the probability of satisfying the specification of the evaluation item is calculated for each of these four normal distributions. For example, in a case of FIG. 3, the probability value at which the first normal distribution N ($\mu_{min}$, $\sigma_{min}^2$) resides between $SPEC_{min}$ and $SPEC_{max}$ is derived. This probability value is the yield Y1. The yields Y2, Y3, and Y4 are derived in similar manner for the second normal distribution N ($\mu_{min}$, $\sigma_{max}^2$), the third normal distribution N ($\mu_{max}$, $\sigma_{min}^2$), and the fourth normal distribution N ($\mu_{max}$, $\sigma_{max}^2$). It is to be noted that the yield values are evaluated by using a standard normal distribution tables.

Subsequently, through comparison among Y1, Y2, Y3, and Y4, the smallest value is regarded as a minimum value of the statistical yield ($Y_{min}$) while the largest value is regarded as a maximum value of the statistical yield ($Y_{max}$). An interval [$Y_{min}$, $Y_{max}$] specified by the minimum value ($Y_{min}$) and the maximum value ($Y_{max}$) of the statistical yield is defined as "a confidence interval of a yield" herein. This confidence interval of the yield is an available range of the yield of the circuit undergoing the Monte Carlo analysis at the confidence level set at Step S1.

(6) Subsequently, it is determined whether or not a target yield achieving determination is enabled (Step S6). Specifically, the target yield ($Y_{target}$) and the confidence interval of the yield calculated at Step S4 are compared. In a case where the target yield falls within the confidence interval of the yield (i.e., $Y_{min} < Y_{target} \leq Y_{max}$), it is determined that the target yield achieving determination is disabled and the procedure goes to Step S8. On the other hand, in a case where the target yield does not fall within the confidence interval of the yield (i.e., $Y_{min} \geq Y_{target}$ or $Y_{max} < Y_{target}$), it is determined that the target yield achieving determination is enabled, and the procedure goes to Step S7.

(7) It is determined whether or not the target yield will be achieved (Step S7).

Specifically, in a case where the minimum value of the confidence interval of the yield is the target yield set at Step S1 or larger (i.e., $Y_{min} \geq Y_{target}$), it is determined that the target yield will be achieved, and the Monte Carlo analysis is ended (End 1).

On the other hand, in a case where the maximum value of the confidence interval of the yield is smaller than the target yield set at Step S1 (i.e., $Y_{max} < Y_{target}$), it is determined that the target yield will not be achieved, and the Monte Carlo analysis is ended (End 2).

Figure 5:
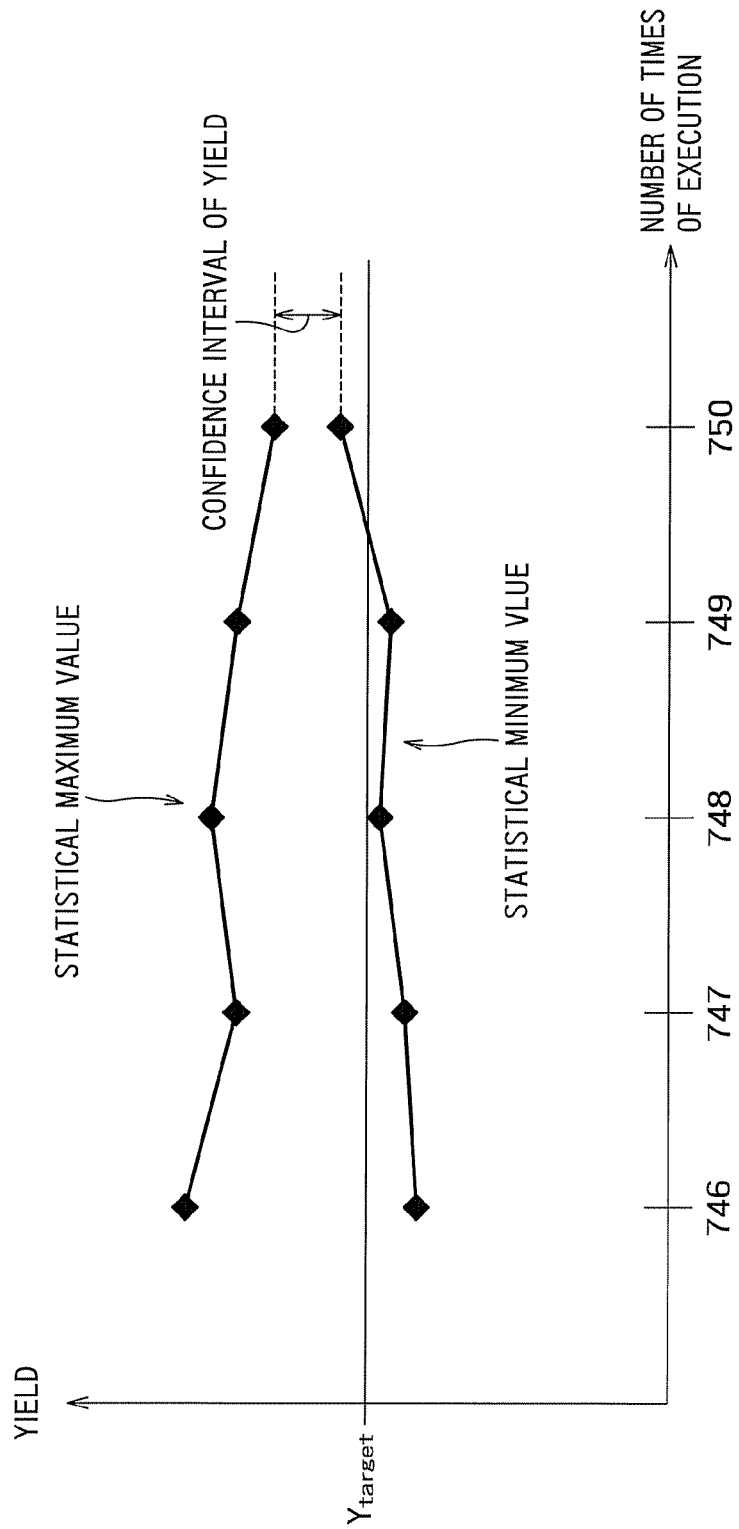
FIG. 5 is a graph in which a confidence interval of a yield is plotted per number of times of execution of a Monte Carlo simulation.
Figure 6:
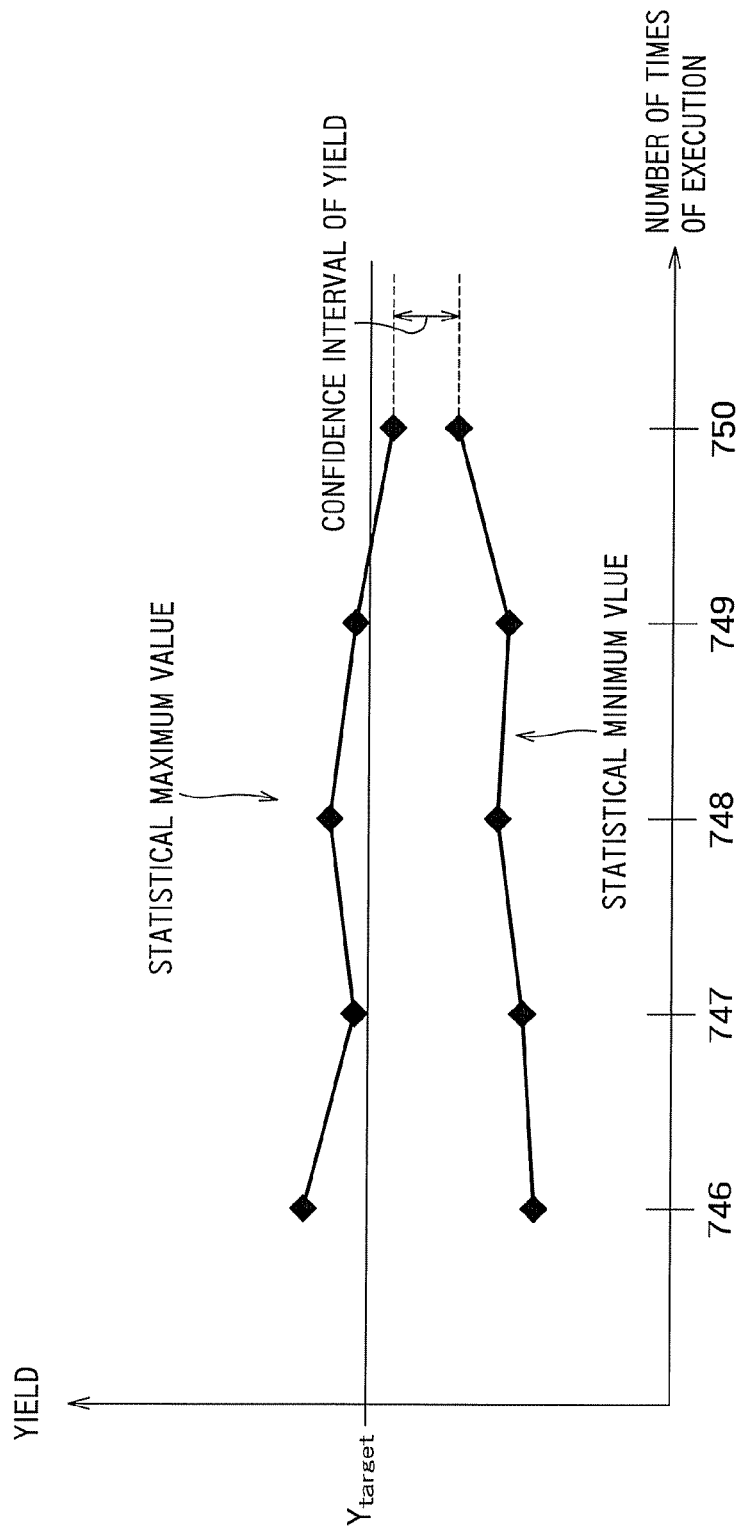
FIG. 6 is a graph in which the confidence interval of the yield is plotted per number of times of execution of the Monte Carlo simulation.

FIGS. 5 and 6 illustrate graphs in each of which the confidence interval of the yield is plotted per number of times of execution of the Monte Carlo simulation.

In a case of FIG. 5, at a 750th simulation (n=750), the minimum value of the confidence interval of the yield (that is, a statistical minimum value) is above the target yield set at Step S1. Accordingly, it is determined that the target yield will be achieved, and the 751st and subsequent Monte Carlo analyses will not be conducted.

On the other hand, in a case of FIG. 6, at a 750th simulation (n=750), the maximum value of the confidence interval of the yield (that is, a statistical maximum value) is below the target yield set at Step S1. Accordingly, it is determined that the target yield will not be achieved, and the 751st and subsequent Monte Carlo analyses will not be conducted.

The determination at this step has a 95% probability of being a correct determination assuming the confidence level is set to 95%. In the present embodiment, the Monte Carlo analysis is ended at the time when a determination result satisfying the set confidence level is obtained.

(8) It is determined whether or not the number of times of execution of the simulation (n) has reached the maximum number of times of execution ($N_{max}$) (Step S8). If Yes, the Monte Carlo analysis is ended (End 3). If No, the procedure returns to Step S3, and the Monte Carlo simulation executing unit is instructed to conduct a subsequent simulation.

As described above, End 1 shown in FIG. 1 represents a state where the analysis has been ended as it is determined that the target yield will be achieved at a predetermined confidence level while End 2 represents a state where the analysis has been ended as it is determined that the target yield will not be achieved at a predetermined confidence level. Also, End 3 represents a state where the analysis has been ended without enabling to determine whether or not the target yield will be achieved since the maximum number of times of execution has been reached.

Meanwhile, in the foregoing description of the embodiment, the confidence interval of the yield is calculated each time the Monte Carlo simulation is ended. However, the embodiment is not limited to this, and the confidence interval of the yield may be calculated each time as many times of Monte Carlo simulation as a predetermined number of times are conducted. That is, at Step S4, the Monte Carlo simulation executing unit may be instructed to conduct as many times of Monte Carlo simulation as the predetermined number of times.

In the present embodiment, it is determined whether or not the target yield will be achieved at a predetermined confidence level each time as many times of Monte Carlo analysis as a predetermined number of times are conducted, as described above. Thus, the number of times of execution of the Monte Carlo analysis can be optimized in accordance with various specifications (the target yield and the specification of the evaluation item) and the required determination accuracy (confidence level). In other words, the Monte Carlo analysis based on the result of as many times of simulation as necessary and sufficient to obtain a determination result in which a required confidence is secured can be conducted. Consequently, redundant simulations can be prevented from executing, and time required for the Monte Carlo analysis can be shortened as much as possible.

Meanwhile, the confidence interval of the yield as well as the confidence interval of the mean or the standard deviation tends to become narrower as the number of times of execution of the Monte Carlo analysis (sampling number) increases. However, since an analysis is conducted based on a result of a simulation with a parameter set utilizing random numbers in the Monte Carlo analysis, the confidence interval of the yield is not necessarily narrowed in a monotonous manner as shown in FIGS. 5 and 6. Thus, in a case where the Monte Carlo analysis is continued after it has been determined whether or not the target yield will be achieved (Step S7), the determination is reversed in some cases.

Figure 7:
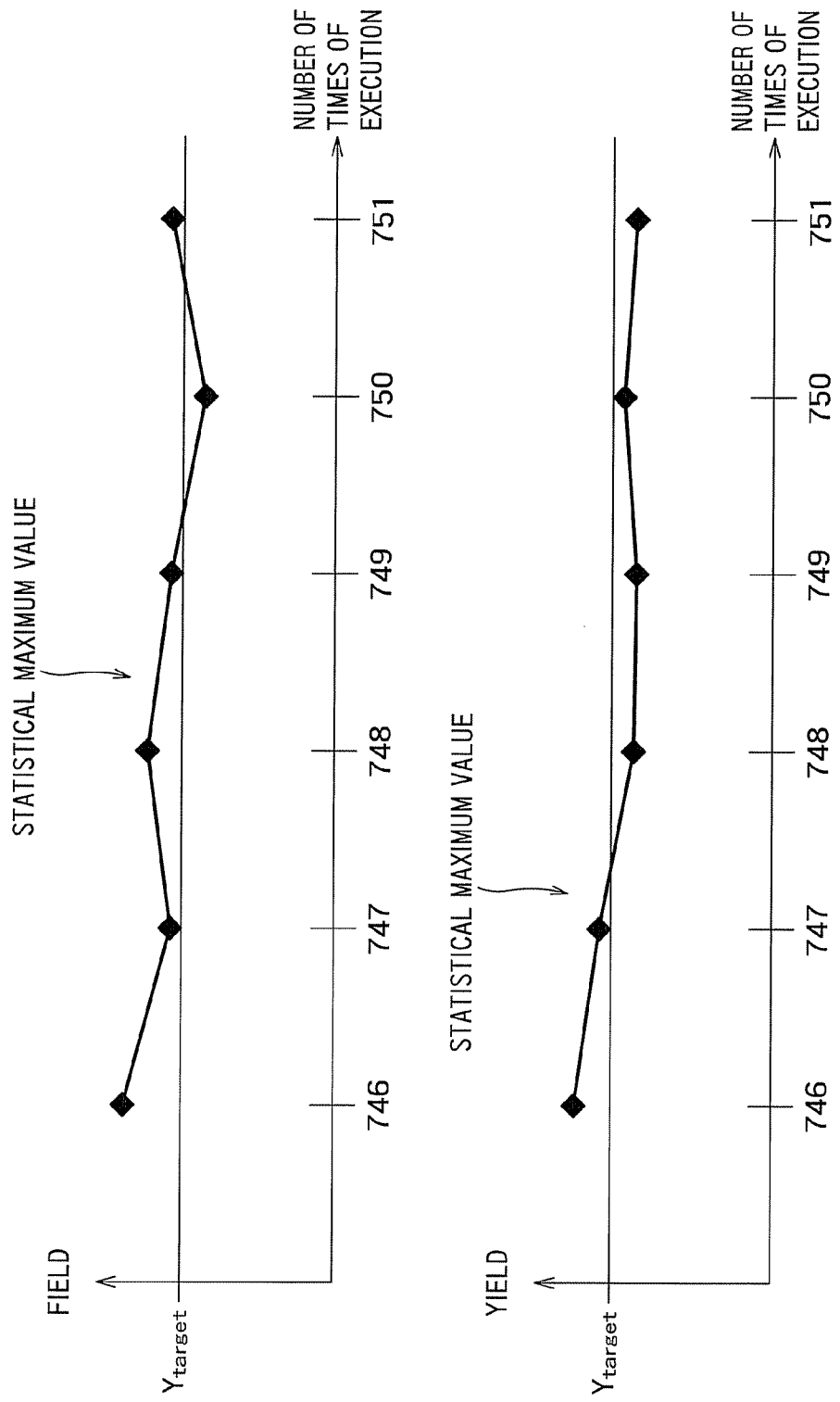
FIGS. 7(a) and 7(b) are graphs in each of which the confidence interval of the yield is plotted per number of times of execution of the Monte Carlo simulation in a case where the modification procedure of Step S6 is conducted.

FIG. 7(a) illustrates such a case. In this case, as a result of the 750th Monte Carlo analysis, the maximum value of the confidence interval of the yield is below the target yield, and it is determined that the target yield will not be achieved. However, as a result of the 751st Monte Carlo analysis, the maximum value of the confidence interval of the yield is above the target yield again, and the target yield achieving determination is disabled. In such a manner, there is a case in which the target yield achieving determination is once enabled but is disabled in any one of the subsequent analyses. Accordingly, for more accurate determination, it is preferable to conduct the determination at Step S7 in a case where the target yield achieving determination is enabled for a consecutive predetermined number of times.

Figure 4:
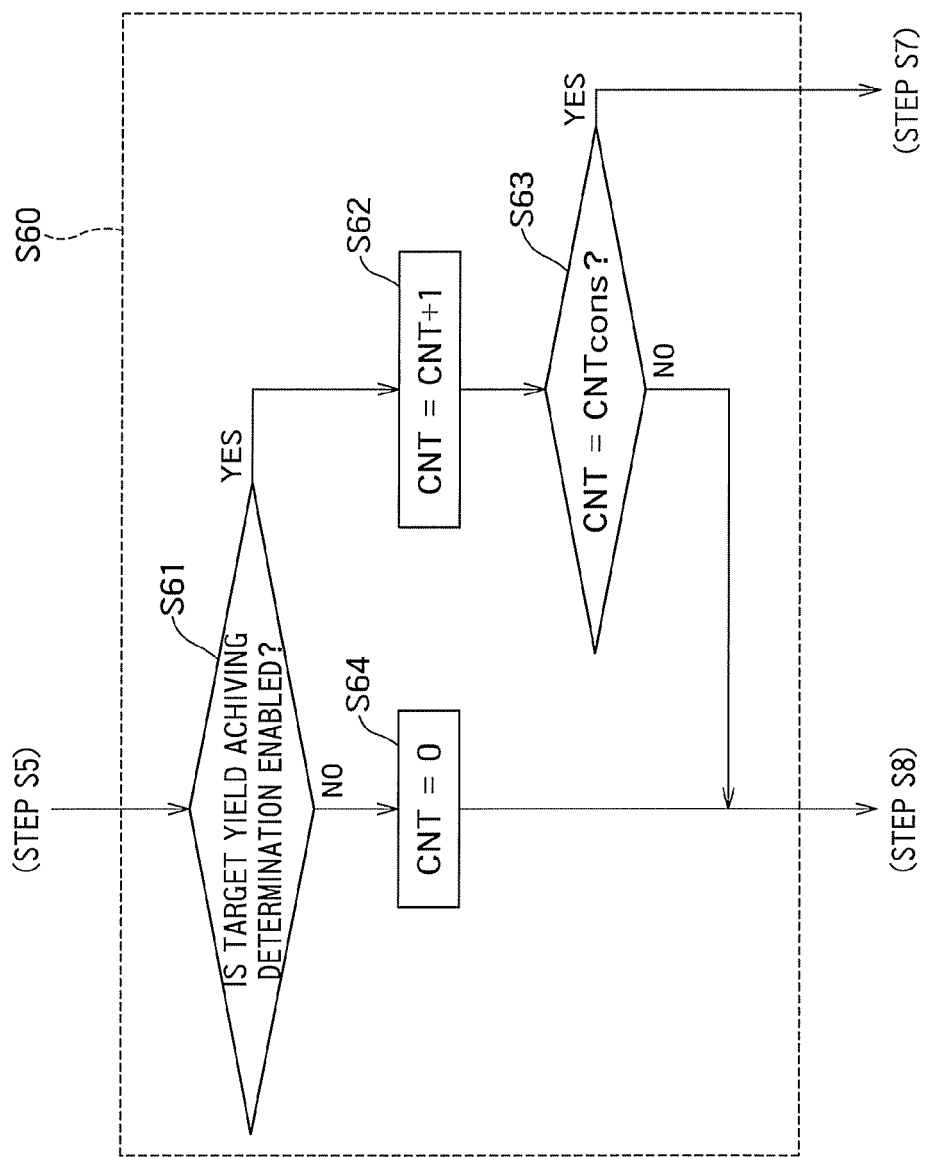
FIG. 4 is a flowchart illustrating a modification procedure of Step S6.

FIG. 4 is a flowchart illustrating a procedure in such a case. Step S6 in FIG. 1 is replaced with Step S60 shown in FIG. 4. At Step S60, a variable CNT representing the number of times of a determination in which the target yield achieving determination is enabled is used. This variable CNT is initialized at Step S2, for example (CNT=0).

Step S61 is the same processing as Step S6 described above. In a case where it is determined that the target yield achieving determination is enabled, the procedure goes to Step S62, and the variable CNT is incremented by one. On the other hand, in a case where it is determined that the target yield achieving determination is disabled, the procedure goes to Step S64, and the variable CNT becomes 0.

At Step S63, it is determined whether or not the variable CNT has reached a predetermined value $CNT_{CONS}$ (e.g., 10). The procedure goes to Step S7 if Yes and goes to Step S8 if No.

As described above, in the procedure at Step S60, the determination at Step S7 is conducted only after the target yield achieving determination is enabled for a consecutive predetermined number of times ($CNT_{CONS}$).

FIG. 7(b) is a graph to describe a determination of whether or not the target yield will be achieved when $CNT_{CONS}=4$. The statistical maximum value is below the target yield in the 748th to 751st Monte Carlo analyses, and the target yield achieving determination is enabled four times in a row. Hence, the 752nd Monte Carlo simulation will not be executed, but the target yield achieving determination at Step S7 is conducted. In this case, since the maximum value of the statistical yield is below the target yield, it is determined that the target yield will not be achieved.

Next, a procedure to change the state of End 2, in which it has been determined that the target yield will not be achieved, to a state in which it is determined that the target yield will be achieved will be described with reference to a flowchart in FIG. 8.

(1) It is determined whether or not the circuit undergoing the Monte Carlo analysis will be repaired (Step S21). If Yes, the circuit is repaired (Step S22), and then the procedure returns to Step S1 (or Step S2) to restart the Monte Carlo analysis from the beginning. On the other hand, if the answer is No at Step S21, the procedure goes to Step S23.

Meanwhile, in restarting the Monte Carlo analysis from the beginning, it is preferable to instruct the Monte Carlo simulation executing unit to conduct a Monte Carlo simulation for the repaired circuit with use of the parameter set used in the last Monte Carlo simulation. It is to be noted that "the last Monte Carlo simulation" is a previous Monte Carlo simulation in which it has been determined that the target yield will not be achieved. This enables to confirm if the circuit repair conducted at Step S22 is valid under the same conditions as those in "the last Monte Carlo simulation." It is to be noted that a parameter set for use in a reevaluation is not limited to one used in the last Monte Carlo simulation but may be a parameter set used in a simulation in which a value that does not satisfy the specification of the evaluation item has been obtained among the Monte Carlo analyses executed previously.

(2) Subsequently, it is determined whether or not the target yield will be changed (Step S23). If Yes, the target yield is changed (Step S24). Thereafter, the procedure goes to Step S6 if there is no other change and goes to Step S26 if there is another change (Step S25). At Step S24, the value of the target yield is alleviated from 4σ to 3σ, for example. On the other hand, if the answer is No at Step S23, the procedure directly goes to Step S26.

(3) Subsequently, it is determined whether or not the specification of the evaluation item will be changed (Step S26). If Yes, the specification of the evaluation item is changed (Step S27). Thereafter, the procedure goes to Step S5 (more specifically, Step S105) if there is no other change and goes to Step S29 if there is another change (Step S28). If the answer is No at Step S26, the procedure directly goes to Step S29.

The change of the specification of the evaluation item means for the example of the oscillator circuit, the specification of oscillating frequency is alleviated from 32 kHz±3% to 32 kHz±5%. Such alleviation of the specification can be done in a case where, in a system consisting of amplifiers in plural stages, a specification of the entire system can be satisfied since, even if a specification of an amplifier is alleviated, supposing that specifications of the other amplifiers have sufficient margins.

(4) It is determined whether or not the confidence level will be changed (Step S29). If Yes, the confidence level is changed (Step S30), and then the procedure goes to Step S5 (more specifically, Step S102). At Step S30, the confidence level is alleviated from 95% to 90%, for example. On the other hand, if the answer is No at Step S29, the procedure reaches End 4.

As described above, the procedure shown in FIG. 8 is an example of a procedure to efficiently lead to a target yield achieving state from the state of End 2, in which it is determined that the target yield will not be achieved, and in which the Monte Carlo analysis is ended, by the circuit repair and/or the alleviation of the level and/or the specification.

According to this procedure, the results of the Monte Carlo analyses executed previously can be used again. Especially in a case where the target yield is to be changed, the statistical yield does not need to be recalculated, but the determination at Step S6 has only to be conducted again with use of the changed target yield.

In a case where the specification of the evaluation item is to be changed, the statistical yield needs to be recalculated. However, the statistical yield can be calculated with use of the values of the evaluation item obtained in the simulations executed previously. Accordingly, time required for a new Monte Carlo analysis can be shortened as much as time required for the execution of the previous simulations.

Figure 8:
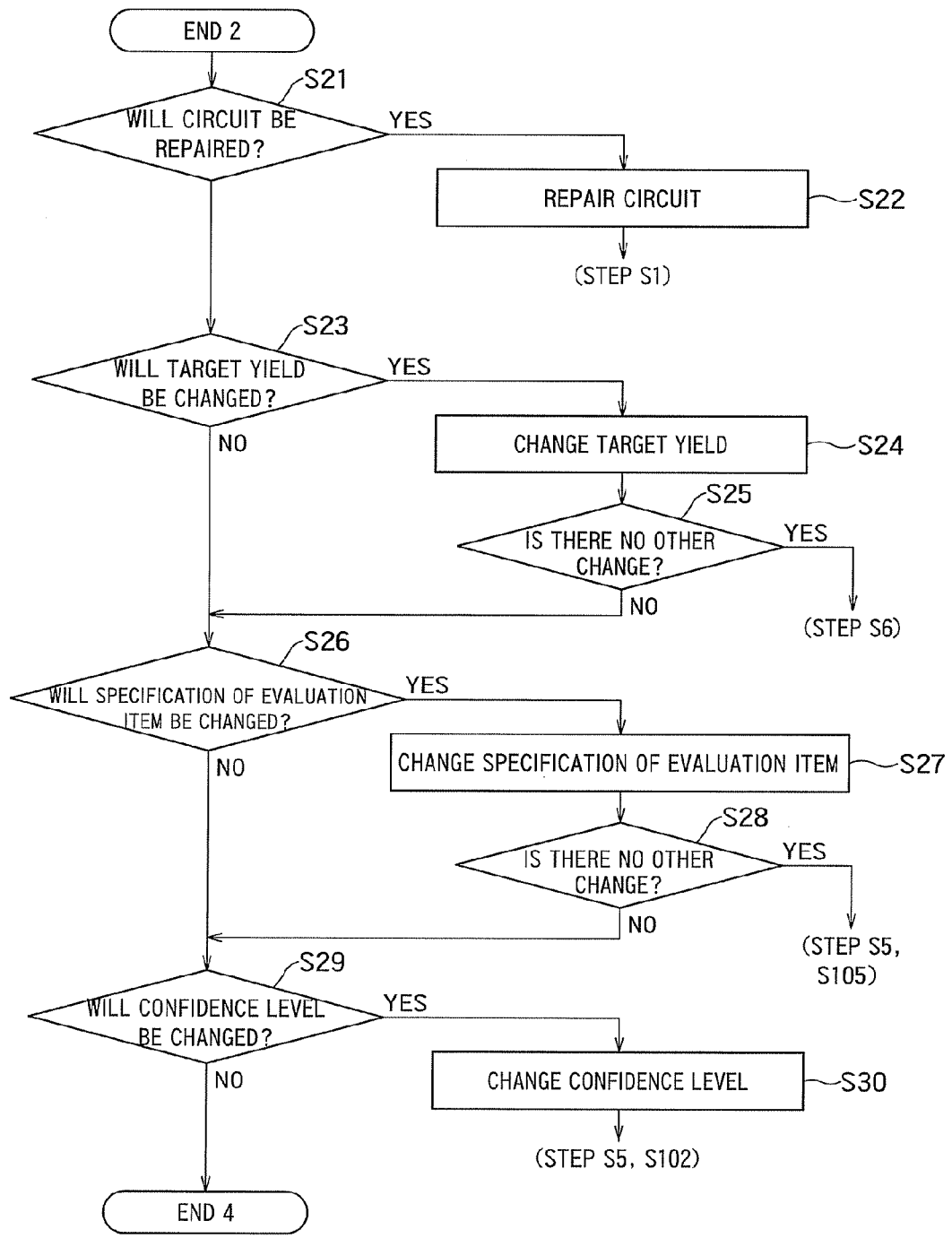
FIG. 8 is a flowchart illustrating a procedure to improve a state from End 2 to End 1.

Meanwhile, as is apparent from FIG. 8, in a case where the target yield cannot be achieved even by the circuit repair and/or the alleviation of the level and/or the specification, or where the circuit repair and/or the alleviation of the level and/or the specification cannot be done any more, the procedure will reach the state of End 4. However, the flow in FIG. 8 may be done at a stage at which design verification has proceeded to some extent, such as when the alleviation of the level and/or the specification for a block undergoing the Monte Carlo analysis becomes possible in the proceeding of design verification of other blocks. By doing so, the result of the execution of the Monte Carlo analysis conducted before the procedure reaches End 2 and the parameter set used in the simulation can be used again, which can shorten time required for a new Monte Carlo analysis.

There is a case in which, in a case where nearly as many times of Monte Carlo analysis as the maximum number of times of execution of the simulation ($N_{max}$) have been conducted before reaching the state of End 2, the procedure does not reach the state of End 1 since the remaining number of times of execution is small even when the level and/or the specification are/is changed, and the procedure returns to Step S5 or Step S6. To avoid this, in a case where the remaining number of times of execution is smaller than a predetermined number of times, the maximum number of times of execution ($N_{max}$) may be increased before the procedure returns to Step S5 or Step S6.

Next, a procedure to change the state of End 3, in which the procedure is ended without being able to determine whether or not the target yield will be achieved because the number of times of execution of the Monte Carlo analysis has reached the maximum number of times of execution, to a state in which it is determined that the target yield will be achieved will be described with reference to a flowchart in FIG. 9.

The maximum number of times of execution ($N_{max}$) is increased by an additional number of times of execution ($N_{add}$) (Step S31), and the procedure returns to Step S3. The additional number of times of execution ($N_{add}$) is preferably determined with reference to the graph in FIG. 5, for example.

In such a manner, by increasing the number of times of execution of the Monte Carlo simulation, the target yield achieving determination is enabled, or the possibility to change the determination in which the target yield will not be achieved to the determination in which it will be achieved can be sought.

As described above, according to the first embodiment, time required for the Monte Carlo analysis can be shortened as much as possible while the required determination accuracy (i.e., confidence level) of the result of the Monte Carlo analysis is secured.

Second Embodiment

Next, a second embodiment of the present invention will be described. The second embodiment is a Monte Carlo analysis execution controlling apparatus (hereinafter abbreviated as "MC analysis execution controlling apparatus") conducting the Monte Carlo analysis execution controlling method described in the first embodiment.

Figure 10:
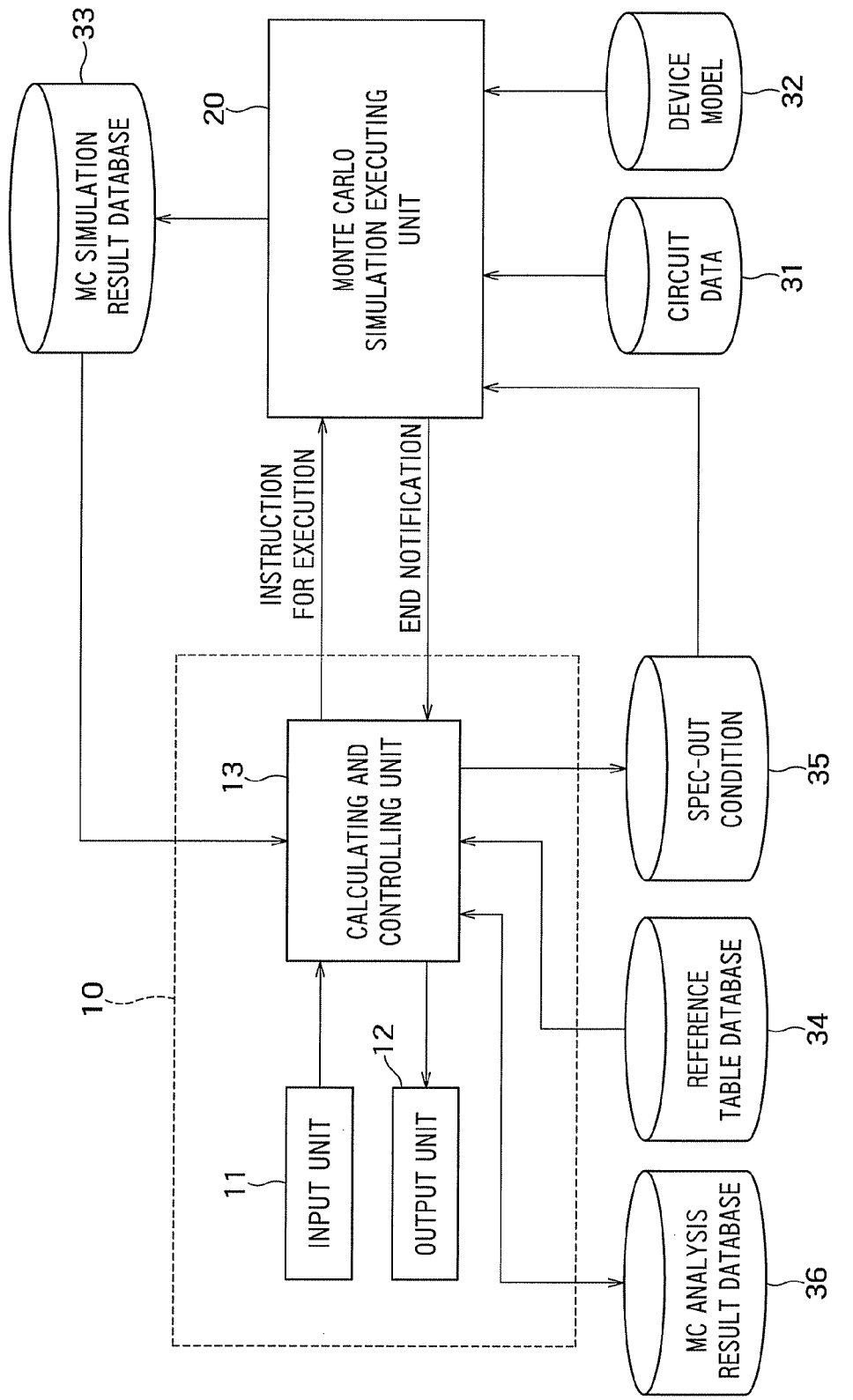
FIG. 10 is a block diagram illustrating a schematic configuration of a Monte Carlo analysis execution controlling apparatus.

FIG. 10 illustrates a block diagram of an MC analysis execution controlling apparatus 10 according to the present embodiment, a Monte Carlo simulation executing unit 20, and various databases 31 to 36.

The MC analysis execution controlling apparatus 10 instructs the Monte Carlo simulation executing unit 20 for execution. On receiving this instruction for execution, the Monte Carlo simulation executing unit 20 executes a Monte Carlo simulation with use of circuit data 31 and a device model 32. Here, the circuit data 31 is data (netlist or the like) representing a configuration of a circuit undergoing the Monte Carlo analysis. Also, the device model 32 contains kinds of parameters for use in the Monte Carlo simulation and characteristics (average, standard deviation, etc.) for each parameter.

An MC simulation result database 33 has stored therein results of execution of Monte Carlo simulations output by the Monte Carlo simulation executing unit 20. The MC simulation result database 33 has stored therein the entire results of the respective Monte Carlo simulations.

An MC analysis result database 36 has stored therein a statistical yield (a minimum value and a maximum value of a confidence interval of a yield) obtained in each Monte Carlo analysis. In addition, the MC analysis result database 36 may have stored therein information obtained in the middle of the Monte Carlo analyses such as an average and a standard deviation of values of an evaluation item and information of whether or not a target yield will be achieved.

Next, a configuration of the MC analysis execution controlling apparatus 10 will be described in details.

As shown in FIG. 10, the MC analysis execution controlling apparatus 10 includes an input unit 11, an output unit 12, and a calculating and controlling unit 13.

The input unit 11 is a device to allow an operator to input setting information such as a target yield ($Y_{target}$), a specification of an evaluation item, a confidence level, and a maximum number of times of execution ($N_{max}$). Examples of this input unit 11 are a keyboard and a touch panel.

The output unit 12 is a device to output information received from the calculating and controlling unit 13 such as a result of a Monte Carlo analysis to the operator and is a display or a printer, for example. On this output unit 12, not only a final result of the Monte Carlo analysis (that is, the determination of whether or not the target yield will be achieved) but also a graph representing an intermediate result of the Monte Carlo analysis such as one in FIG. 5 may be displayed.

On receiving a notification (end notification) that a first Monte Carlo simulation is ended from the Monte Carlo simulation executing unit 20, the calculating and controlling unit 13 calculates the confidence interval of the yield with use of the simulation result stored in the MC simulation result database 33 and information input in the input unit 11 (the specification of the evaluation item and the confidence level). The calculation of the confidence interval of the yield is done in accordance with Step S5 (more specifically, S101 to S105 and FIG. 2) described in the first embodiment.

The calculating and controlling unit 13 stores information obtained by the Monte Carlo analysis such as the confidence interval of the yield in the MC analysis result database 36. The unit 13 also reads out the information stored in the MC analysis result database 36 and lets it displayed on the output unit 12.

Meanwhile, in calculating the confidence interval of the yield, the calculating and controlling unit 13 may refer to a reference table database 34 as needed. This reference table database 34 is a database containing at least one of a t distribution table, an $\chi^2$ distribution table, and a standard normal distribution table. Also, the calculating and controlling unit 13 may instruct the Monte Carlo simulation executing unit 20 to execute the Monte Carlo simulation predetermined times instead of once.

After calculating the confidence interval of the yield, the calculating and controlling unit 13 compares the calculated confidence interval of the yield with the set target yield and thereby conducts Step S6 described in the first embodiment, that is, determines whether or not a target yield achieving determination is enabled. In a case where the target yield achieving determination is disabled, the calculating and controlling unit 13 instructs the Monte Carlo simulation executing unit 20 to execute a subsequent Monte Carlo simulation. However, in a case where the number of times of execution of the Monte Carlo simulation has reached the set maximum number of times of execution, the calculating and controlling unit 13 will not instruct the Monte Carlo simulation executing unit 20 for execution and transmit to the output unit 12 an end of the Monte Carlo analysis because of reaching to the maximum number of times of execution.

On the other hand, in a case where the target yield achieving determination is enabled, the calculating and controlling unit 13 will not instruct the Monte Carlo simulation executing unit 20 for execution, determine whether or not the target yield will be achieved, and transmit the result (achievement or no achievement of the target yield) to the output unit 12.

It is to be noted that the calculating and controlling unit 13 may conduct the processing of Step S60 instead of the processing of Step S6.

Figure 9:
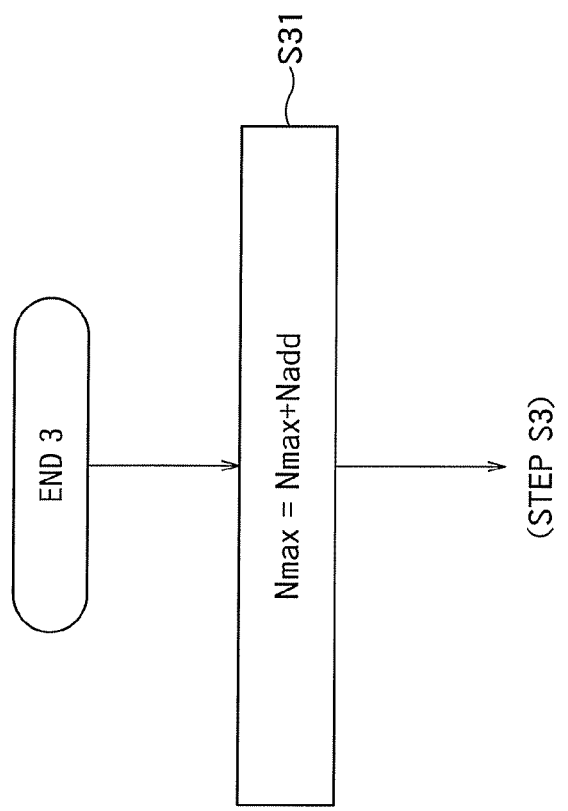
FIG. 9 is a flowchart illustrating a procedure to improve a state from End 3 to End 1.

The calculating and controlling unit 13 may be configured to execute the flows described in FIG. 8 and/or FIG. 9.

In a case where the calculating and controlling unit 13 has determined that the target yield will not be achieved, the unit 13 may output a parameter set used in the current Monte Carlo simulation in a memory unit (not shown) and store it as a spec-out condition 35. The spec-out condition 35 to be stored may be a parameter set used in a Monte Carlo simulation in which a value that does not satisfy the specification of the evaluation item has been obtained among the Monte Carlo analyses executed previously.

The calculating and controlling unit 13 may instruct the Monte Carlo simulation executing unit 20 for execution so as to use data in the spec-out condition 35 instead of data in the device model 32.

The first and second embodiments of the present invention have been described above.

Meanwhile, at least part of the Monte Carlo analysis execution controlling method described in the first embodiment may be configured as hardware or software. In a case where it is configured as software, a program carrying out at least a partial function of the Monte Carlo analysis execution controlling method may be stored in a recording medium such as a flexible disk or a CD-ROM to be read and executed by a computer. The recording medium is not limited to a removable one such as a magnetic disk or an optical disk but may be a fixed-type recording medium such as a hard disk device or a memory.

Also, the program carrying out at least a partial function of the Monte Carlo analysis execution controlling method may be distributed via communication lines such as the Internet (including a wireless communication). Further, the program may be distributed via a wire or wireless communication such as the Internet in a modulated or compressed state or by being stored in a recording medium.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of determining whether or not a circuit will achieve a target value of a yield at a predetermined confidence level, the method comprising:
setting a target yield as the target value of the yield, a specification of an evaluation item, and a confidence level;
instructing a Monte Carlo simulation executing unit to execute a Monte Carlo simulation to obtain a value of the evaluation item of the circuit;
after an end of the Monte Carlo simulation, calculating a confidence interval of a yield as an available range of the yield of the circuit at the confidence level, based on one or more values of the evaluation item obtained in Monte Carlo simulations, the specification of the evaluation item, and the confidence level;
determining, in a first determination process, whether or not the target yield is within the confidence interval of the yield;
when the target yield is within the confidence interval of the yield, instructing the Monte Carlo simulation executing unit to execute a subsequent Monte Carlo simulation; and
when the target yield is not within the confidence interval of the yield:
determining, in a second determination process, that the target yield will be achieved when a minimum value of the confidence interval of the yield is the target yield or larger; and
determining, in the second determination process, that the target yield will not be achieved when a maximum value of the confidence interval of the yield is below the target yield,
wherein the method is at least partly performed by one or more processors.

2. The method of claim 1, wherein calculating the confidence interval of the yield comprises:
calculating a first average and a first standard deviation of the values of the evaluation item obtained in the previous Monte Carlo simulations;
calculating a first confidence interval of the first average and a second confidence interval of the first standard deviation;
creating a first normal distribution having a second average equal to a minimum value of the first confidence interval and having a second standard deviation equal to a minimum value of the second confidence interval
creating a second normal distribution having a third average equal to a minimum value of the first confidence interval and having a third standard deviation equal to a maximum value of the second confidence interval;
creating a third normal distribution having a fourth average equal to a maximum value of the first confidence interval and having a fourth standard deviation equal to a minimum value of the second confidence interval;
creating a fourth normal distribution having a fifth average equal to a maximum value of the first confidence interval and having a fifth standard deviation equal to a maximum value of the second confidence interval;
calculating first to fourth yields each as a probability of satisfying the specification of the evaluation item for the first to fourth normal distributions, respectively; and
creating an interval having a minimum value equal to the smallest value among the first to fourth yields and having a maximum value equal to the largest value among the first to fourth yields.

3. The method of claim 2, wherein the calculating the confidence interval of the average comprises:
deriving a standard error ($\sigma_{error}$) by Equation (1);
deriving a value t ($t_{value}$) corresponding to the confidence level with reference to a t distribution table;
deriving a value (A) corresponding to a width of the confidence interval by Equation (2); and
deriving a minimum value ($\mu_{min}$) and a maximum value ($\mu_{max}$) of the confidence interval of the average by Equation (3) and Equation (4), respectively, and
wherein the calculating the confidence interval of the standard deviation comprises:
deriving a minimum value ($\sigma_{min}$) and a maximum value ($\sigma_{max}$) of the confidence interval of the standard deviation by Equation (5) and Equation (6), respectively, $$\sigma_{error} = \frac{\sigma}{\sqrt{n}} \quad (1)$$

where $\sigma$ is the standard deviation, and n is a number of times of execution of the Monte Carlo simulation, $$A = t_{value} \cdot \sigma_{error} \quad (2)$$

where $t_{value}$ is the value t corresponding to the confidence level, and $\sigma_{error}$ is the standard error calculated by Equation (1), $$\mu_{min} = \mu - A \quad (3)$$

$$\mu_{max} = \mu + A \quad (4)$$

where $\mu$ is the average, and $$\sigma_{min} = \sigma \sqrt{\frac{n-1}{\chi^2(\frac{\alpha}{2})}} \quad (5)$$

$$\sigma_{max} = \sigma \sqrt{\frac{n-1}{\chi^2(-\frac{\alpha}{2})}} \quad (6)$$

where $\sigma$ is the standard deviation, n is the number of times of execution of the Monte Carlo simulation, $\chi^2(\ )$ is an $\chi^2$ distribution, and $\alpha$ is 1−(confidence level [%]/100).

4. The method of claim 2, wherein the second determination processing is conducted only after the determination that the target yield is not within the confidence interval of the yield is conducted predetermined times in a row.

5. The method of claim 2, further comprising:
repairing the circuit when the second determination processing determines that the target yield will not be achieved; and
thereafter instructing the Monte Carlo simulation executing unit to conduct a Monte Carlo simulation for the repaired circuit using a parameter set used in a last Monte Carlo simulation or a parameter set used in a Monte Carlo simulation in which a value that does not satisfy the specification of the evaluation item has been obtained.

6. The method of claim 2, further comprising:
changing the target yield when the second determination processing determines that the target yield will not be achieved; and
thereafter conducting the first determination processing without calculating a new confidence interval of the yield.

7. The method of claim 2, further comprising:
changing the specification of the evaluation item and/or the confidence level when the second determination processing determines that the target yield will not be achieved; and
thereafter calculating the confidence interval of the yield.

8. The method of claim 7, wherein the calculation of the confidence interval of the yield after the specification of the evaluation item and/or the confidence level have/has been changed is conducted using the values of the evaluation item obtained in the previous Monte Carlo simulations.

9. The method of claim 1, wherein the second determination processing is conducted only after the determination that the target yield is not within the confidence interval of the yield is conducted predetermined times in a row.

10. The method of claim 1, further comprising:
repairing the circuit when the second determination processing determines that the target yield will not be achieved; and
thereafter instructing the Monte Carlo simulation executing unit to conduct a Monte Carlo simulation for the repaired circuit using a parameter set used in a last Monte Carlo simulation or a parameter set used in a Monte Carlo simulation in which a value that does not satisfy the specification of the evaluation item has been obtained.

11. The method of claim 1, further comprising:
changing the target yield when the second determination processing determines that the target yield will not be achieved; and
thereafter conducting the first determination processing without calculating a new confidence interval of the yield.

12. The method of claim 1, further comprising:
changing the specification of the evaluation item and/or the confidence level when the second determination processing determines that the target yield will not be achieved; and
thereafter calculating the confidence interval of the yield.

13. The method of claim 12, wherein the calculation of the confidence interval of the yield after the specification of the evaluation item and/or the confidence level have/has been changed is conducted using the values of the evaluation item obtained in the previous Monte Carlo simulations.

14. A recording medium having stored therein a program carrying out the method of claim 1.

15. A Monte Carlo analysis execution controlling apparatus configured to determine whether or not a circuit will achieve a target value of a yield at a predetermined confidence level, comprising:
an input configured to receive an input of a target yield as the target value of the yield, a specification of an evaluation item, and a confidence level;
an output configured to output received information; and
a controller configured to:
instruct a Monte Carlo simulation executing unit to execute a Monte Carlo simulation to obtain a value of the evaluation item of the circuit;
on receiving a notification that the Monte Carlo simulation is ended from the Monte Carlo simulation executing unit, calculate a confidence interval of a yield as an available range of the yield of the circuit at the confidence level based on results of execution of previous Monte Carlo simulations stored in an MC analysis result database and the specification of the evaluation item and the confidence level input in the input unit;
determine whether or not the target yield is within the confidence interval of the yield;
when the target yield is within the confidence interval of the yield, instruct the Monte Carlo simulation executing unit to execute a subsequent Monte Carlo simulation; and
when the target yield is not within the confidence interval of the yield as a result of the determination processing, determine that the target yield will be achieved and transmit the determination to the output unit when a minimum value of the confidence interval of the yield is the target yield or larger and determine that the target yield will not be achieved and transmit the determination to the output unit when a maximum value of the confidence interval of the yield is below the target yield.

16. The Monte Carlo analysis execution controlling apparatus of claim 15, wherein the controller is further configured to output a parameter set used in the current Monte Carlo simulation in a memory unit when the target yield will not be achieved.

17. The Monte Carlo analysis execution controlling apparatus of claim 15, the controller is further configured to determine whether or not the target yield will be achieved only after determining that the target yield is not within the confidence interval of the yield predetermined times in a row.

* * * * *